(12) United States Patent
Okuno et al.

(10) Patent No.: US 11,618,595 B2
(45) Date of Patent: Apr. 4, 2023

(54) FLYING OBJECT TAKEOFF CONTROL SYSTEM

(71) Applicant: TOYOTA JIDOSHA KABUSHIKI KAISHA, Aichi-ken (JP)

(72) Inventors: Nobuhiro Okuno, Toyota (JP); Kenta Miyahara, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 80 days.

(21) Appl. No.: 17/329,148

(22) Filed: May 25, 2021

(65) Prior Publication Data

US 2022/0035381 A1 Feb. 3, 2022

(30) Foreign Application Priority Data

Jul. 28, 2020 (JP) .............................. JP2020-127707

(51) Int. Cl.
*B64U 70/99* (2023.01)
*B64U 70/93* (2023.01)
*G05D 1/06* (2006.01)
*B64C 39/02* (2023.01)
*B64C 27/52* (2006.01)
*B64C 13/18* (2006.01)
*B64U 30/20* (2023.01)
*B64U 70/80* (2023.01)
*B64U 80/86* (2023.01)

(52) U.S. Cl.
CPC .............. *B64U 70/99* (2023.01); *B64C 13/18* (2013.01); *B64C 27/52* (2013.01); *B64C 39/024* (2013.01); *B64U 70/93* (2023.01); *G05D 1/0623* (2013.01); *G05D 1/0669* (2013.01); *B64U 30/20* (2023.01); *B64U 70/80* (2023.01); *B64U 80/86* (2023.01); *B64U 2201/10* (2023.01)

(58) Field of Classification Search
CPC .......... B64C 2201/18; B64C 2201/208; B64C 2201/205; B64F 1/125; B64F 1/007; B64U 70/00
See application file for complete search history.

(56) References Cited

U.S. PATENT DOCUMENTS

| | | | |
|---|---|---|---|
| 2015/0276353 A1* | 10/2015 | Ueno | B64C 39/022 244/190 |
| 2016/0257424 A1* | 9/2016 | Stabler | B64F 1/20 |
| 2016/0272308 A1* | 9/2016 | Gentry | G05D 1/102 |
| 2020/0278699 A1* | 9/2020 | Shimizu | G05D 1/0669 |

FOREIGN PATENT DOCUMENTS

JP 2019202767 A 11/2019

* cited by examiner

*Primary Examiner* — Nicholas McFall
*Assistant Examiner* — Terri L Filosi
(74) *Attorney, Agent, or Firm* — Hauptman Ham, LLP (57) ABSTRACT

A flight controller of a drone calculates a target attitude of the drone on a port based on the result of acquisition by an anemometer. The flight controller of the drone controls each of a plurality of rotors independently, and controls each of the rotors so as to make the drone on the port take a target attitude.

6 Claims, 9 Drawing Sheets

FLYING OBJECT TAKEOFF CONTROL SYSTEM

CROSS-REFERENCE TO RELATED APPLICATION

This application claims priority to Japanese Patent Application No. 2020-127707 filed on Jul. 28, 2020, incorporated herein by reference in its entirety.

BACKGROUND

1. Technical Field

The present disclosure relates to a flying object takeoff control system.

2. Description of Related Art

As technologies relating to a heliport that is designed for takeoff of multicopters, or the like, a technology of calculating inclination of a helipad from a relative wind speed or the like, and inclining the helipad in accordance with the calculation result has been disclosed (see, for example, FIG. 78 of Japanese Patent Application Publication No. 2019-202767). According to such a related art, even in the situation where wind is blowing around the heliport, it is possible to take off a multicopter smoothly from an inclined surface of the helipad.

SUMMARY

However, when the related art is used, it is necessary to provide the heliport with an angle changeable helipad. Hence, there is room for improvement in terms of preventing complication of the heliport.

In consideration of the above fact, an object of the present disclosure is to provide a flying object takeoff control system capable of achieving smooth takeoff of a flying object including a plurality of rotors, under the situation where wind is blowing, without providing an angle changing function to the heliport.

A flying object takeoff control system in a first aspect of the present disclosure includes: a flying object; a port; a wind speed and wind direction acquisition unit; a target attitude calculation unit; and a rotor control unit. The flying object includes a plurality of rotors. The port is used for the flying object to take off. The wind speed and wind direction acquisition unit is configured to acquire wind speed and wind direction around the port. The target attitude calculation unit is configured to calculate a target attitude of the flying object on the port, based on the result of acquisition by the wind speed and wind direction acquisition unit. The rotor control unit is configured to control each of the rotors independently, and control each of the rotors so as to make the flying object on the port take the target attitude.

Note that the concept of "controlling each of a plurality of rotors" includes controlling the rotation of each of the rotors. In addition, when each rotor is a variable-pitch propeller, the concept also includes controlling the angles of the rotor blades.

According to the above configuration, the flying object including a plurality of rotors takes off from the port. The wind speed and wind direction around the port are acquired by the wind speed and wind direction acquisition unit. Based on the result of acquisition by the wind speed and wind direction acquisition unit, the target attitude calculation unit calculates the target attitude of the flying object on the port. The rotor control unit can control each of the rotors independently, and controls each of the rotors so as to make the flying object on the port take the target attitude. Therefore, when the flying object is made to take off when taking the target attitude, smooth takeoff of the flying object can be achieved under the situation where wind is blowing, without providing an angle changing function to the port.

The flying object takeoff control system in a second aspect of the present disclosure in the configuration in the first aspect may include a plurality of lock mechanisms; and a lock control unit. The lock mechanisms may be configured to lock the flying object to the port. The lock control unit may be configured to control locking and unlocking of each of the lock mechanisms independently, and may be configured to cause some of the lock mechanisms to lock while causing some of the remaining lock mechanisms to unlock so as to allow the flying object on the port to take the target attitude, in accordance with the result of acquisition by the wind speed and wind direction acquisition unit.

The flying object is locked to the port by the lock mechanisms. The lock control unit can control locking and unlocking of each of the lock mechanisms. The lock control unit causes some of the lock mechanisms to lock while causing some of the remaining lock mechanisms to unlock so as to allow the flying object on the port to take the target attitude, in accordance with the result of acquisition by the wind speed and wind direction acquisition unit. This enables the flying object to easily take an inclined attitude for takeoff on the port.

In the flying object takeoff control system in a third aspect of the present disclosure in the configuration in the second aspect, the flying object may include an attitude detection unit that detects the attitude of the flying object. The lock control unit may control such that all the lock mechanisms are put in an unlocked state, when the attitude of the flying object detected by the attitude detection unit coincides with the target attitude.

According to the above configuration, the attitude of the flying object is acquired by the attitude detection unit included in the flying object. The lock control unit also controls such that all the lock mechanisms are put in an unlocked state, when the attitude of the flying object detected by the attitude detection unit coincides with the target attitude. Thus, it is possible to achieve a smoother takeoff of the flying object by using the detection result of the attitude detection unit included in the flying object.

The flying object takeoff control system in a fourth aspect in the configuration in any one of the first to third aspects may include a related information acquisition unit configured to acquire information that is other than the information on the wind speed and the wind direction around the port and that related to factors that possibly influence the attitude of the flying object when the flying object is made to take the target attitude on the port. The rotor control unit may adjust control on each of the rotors in accordance with the information acquired by the related information acquisition unit, when each of the rotors is controlled so as to make the flying object on the port take the target attitude.

According to the above configuration, the related information acquisition unit may acquire information that is other than the information on the wind speed and the wind direction around the port and that is related to factors that possibly influence the attitude of the flying object when the flying object is made to have the target attitude on the port. The rotor control unit may adjust control on each of the rotors in accordance with the information acquired by the related information acquisition unit, when each of the rotors is controlled so as to make the flying object on the port take the target attitude. Therefore, the flying object on the port can easily take the target attitude, and a smoother takeoff of the flying object can be achieved.

The flying object takeoff control system in a fifth aspect of the present disclosure in the configuration in the fourth aspect may include a safety information acquisition unit; and a time determination unit. The safety information acquisition unit may be configured to acquire information related to safety of takeoff of the flying object. The time determination unit may be configured to determine takeoff time of the flying object based on the information acquired by the safety information acquisition unit. The rotor control unit may control each of the rotors so as to make the flying object take the target attitude at the takeoff time, and when performing the control, the rotor control unit may adjust control on each of the rotors in accordance with the information acquired by the related information acquisition unit.

According to the above configuration, the safety information acquisition unit acquires the information related to the safety in takeoff of the flying object, and the time determination unit determines takeoff time of the flying object based on the information acquired by the safety information acquisition unit. The rotor control unit controls each of the rotors so as to make the flying object take the target attitude at the takeoff time, and when performing the control, the rotor control unit adjusts the control on each of the rotors in accordance with the information acquired by the related information acquisition unit. Therefore, the flying object on the port can easily take the target attitude at takeoff time, and can smoothly take off.

In the flying object takeoff control system in a sixth aspect of the present disclosure in the configuration in any one of the first to fifth aspects, the wind speed and wind direction acquisition unit may be provided in the port, and the target attitude calculation unit and the rotor control unit may be provided in the flying object. The flying object takeoff control system may include a transmission unit and a reception unit. The transmission unit may be configured to transmit to the flying object information acquired by the wind speed and wind direction acquisition unit. The reception unit may be provided in the flying object and configured to receive the information transmitted from the transmission unit.

According to the above configuration, the wind speed and wind direction information around the port is acquired by the wind speed and wind direction acquisition unit provided in the port. The information acquired by the wind speed and wind direction acquisition unit is transmitted to the flying object by the transmission unit, and received by the reception unit provided in the flying object. In the flying object, the target attitude calculation unit calculates a target attitude based on the information received by the reception unit, and the rotor control unit executes control for the flying object to take the target attitude. Thus, since the wind speed and wind direction acquisition unit is provided in the port instead of in the flying object, increase in weight of the flying object can be restrained.

In the flying object takeoff control system in a seventh aspect of the present disclosure in the configuration in any one of the first to sixth aspects, the port may be provided in a vehicle.

According to the configuration, the flying object with a target attitude can be disposed on the port provided in the vehicle. Hence, the flying object can smoothly take off from the port provided in the vehicle.

As described in the foregoing, the flying object takeoff control system of the present disclosure has such an excellent effect that a flying object including a plurality of rotors can smoothly take off under the situation where wind is blowing, without providing an angle changing function to the port.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
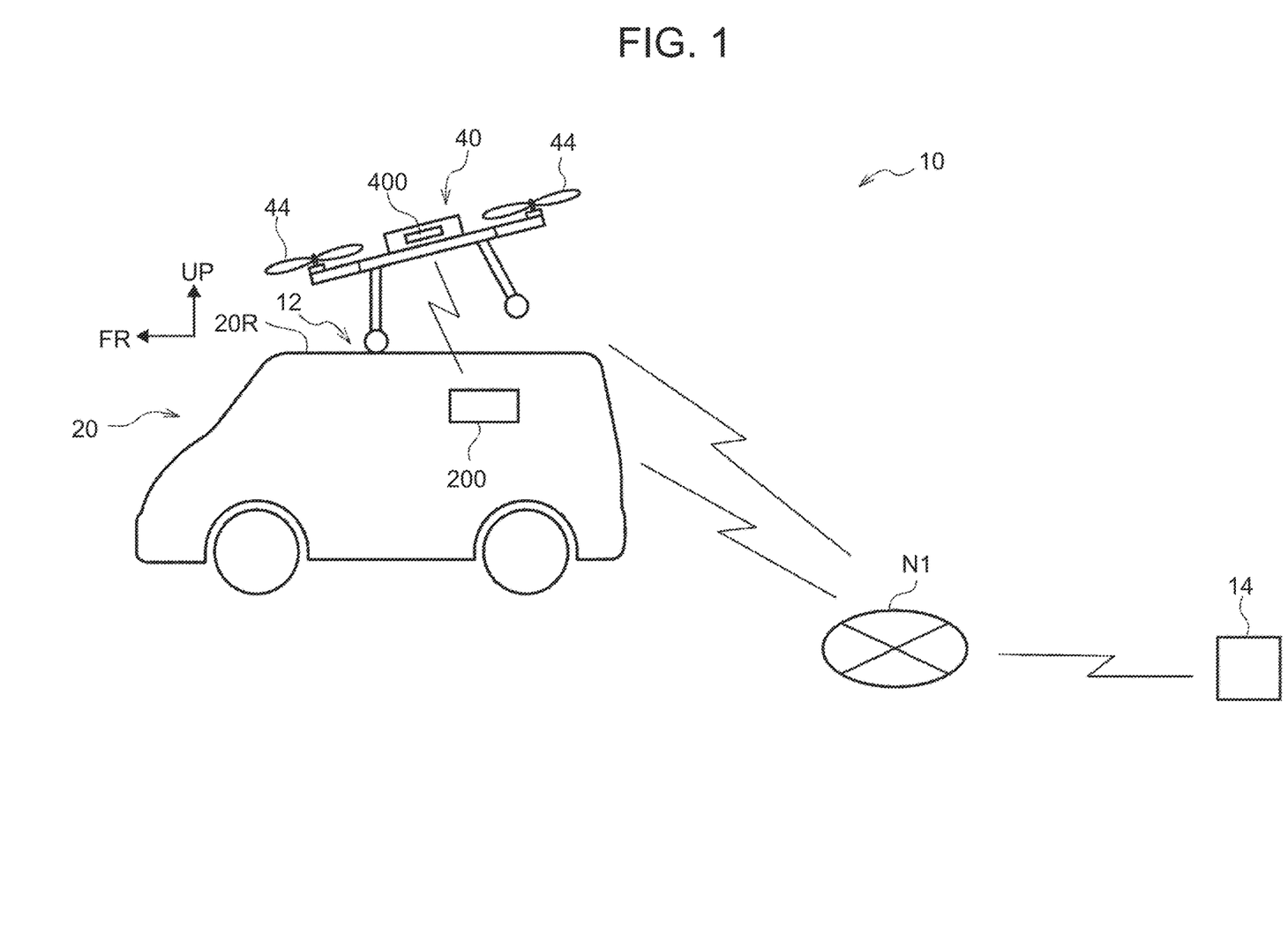
FIG. 1 shows the schematic configuration of a flying object takeoff control system according to a first embodiment.

A flying object takeoff control system according to a first embodiment will be described with reference to FIGS. 1 to 7. In FIGS. 1, 3A and 3B, an arrow FR indicates a front side of the vehicle 20, and an arrow UP indicates an upper side of the vehicle 20.

FIG. 1 shows the schematic configuration of a flying object takeoff control system 10 according to the present embodiment. As shown in FIG. 1, the flying object takeoff control system 10 includes a drone 40 as a flying object including a plurality of rotors 44, and a port 12 where takeoff and landing of the drone 40 is performed. The port 12 is provided on a roof portion 20R of the vehicle 20. The drone 40 can take off and land on the roof portion 20R of the vehicle 20 that is traveling. In the present embodiment, the vehicle 20 includes a control device 200, and the drone 40 includes a flight controller 400. In the flying object takeoff control system 10, the control device 200 of the vehicle 20 and the flight controller 400 of the drone 40 are connected to various servers 14 through a network N1. The control device 200 of the vehicle 20 and the flight controller 400 of the drone 40 are connected to each other through the network N1. The control device 200 of the vehicle 20 and the flight controller 400 of the drone 40 are further configured to be wirelessly communicable with each other without through the network N1.

Figure 2:
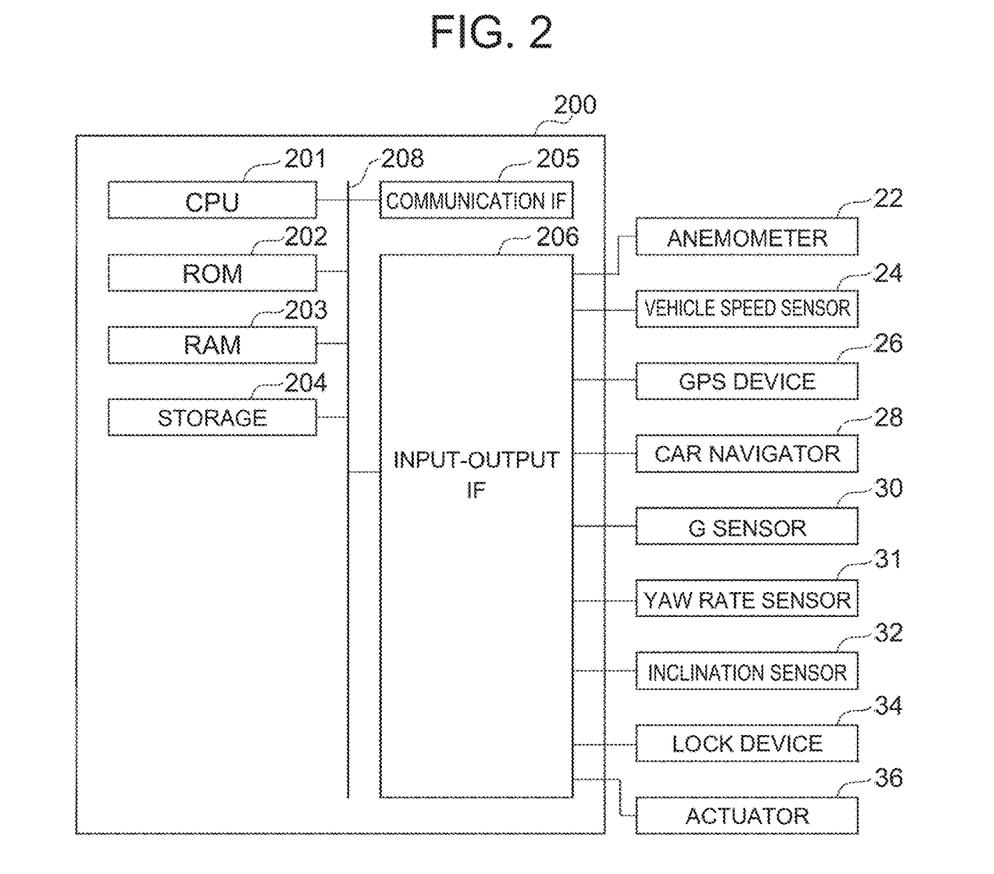
FIG. 2 is a block diagram showing an example of the hardware configuration of devices mounted in a vehicle shown in FIG. 1.
Figure 3A:
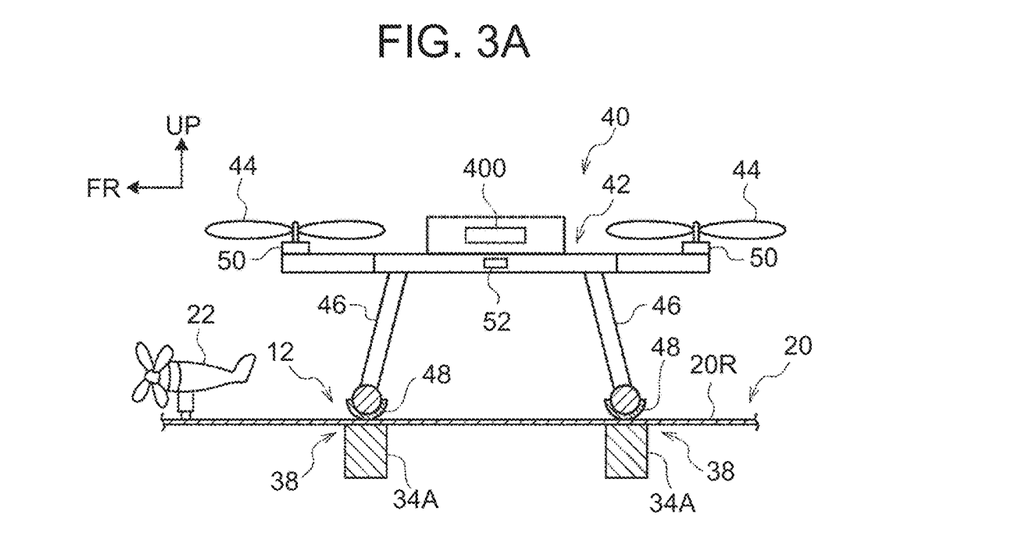
FIG. 3A is a schematic configuration view showing a drone disposed on a port on a roof portion of the vehicle shown in FIG. 1.
Figure 3B:
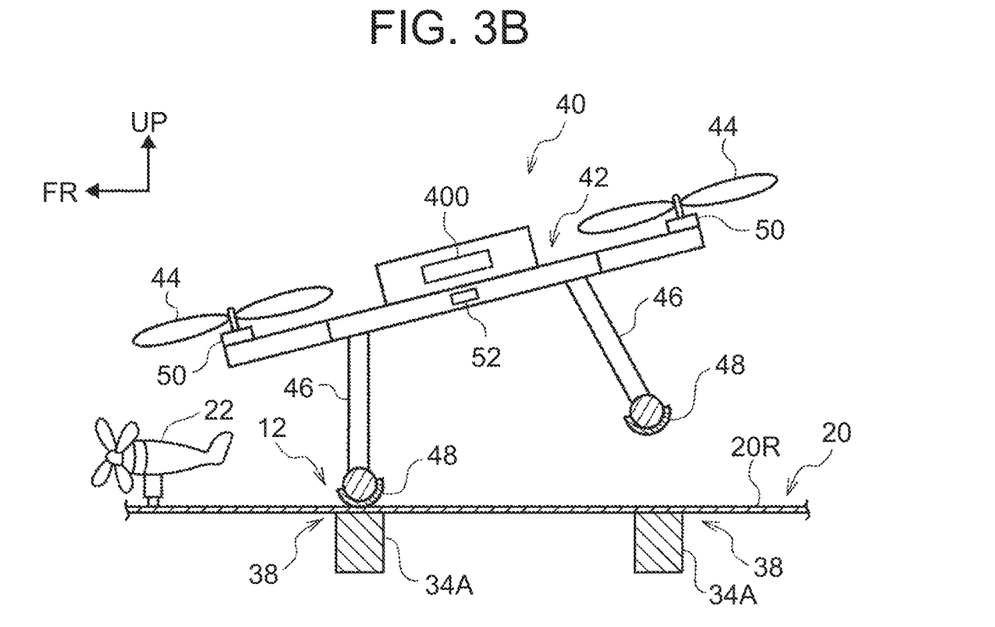
FIG. 3B is a schematic configuration view showing the drone of FIG. 3A with an attitude changed to an inclined attitude.

In FIG. 2, an example of the hardware configuration of the devices mounted in the vehicle 20 is shown in the form of a block diagram. As shown in FIG. 2, the vehicle 20 includes, in addition to the control device 200 described above, an anemometer 22 as the wind speed and wind direction acquisition unit, a vehicle speed sensor 24, a global positioning system (GPS) device 26, a car navigation device (also called a "car navigator") 28, a G sensor 30, a yaw rate sensor 31, an inclination sensor 32, a lock device 34, and an actuator 36.

The anemometer 22 is provided in the port 12 (see FIG. 3A) to acquire the wind speed and wind direction around the port 12. The vehicle speed sensor 24 detects the vehicle speed of the vehicle 20. The GPS device 26 acquires a current position of the vehicle 20. The car navigation device 28 allows input of destination information (destination). The car navigation device 28 searches for a travel route to the destination and displays the searched route. The G sensor 30 detects acceleration in a front-rear direction and acceleration in a width direction in the vicinity of the center of gravity of the vehicle 20. The yaw rate sensor 31 detects the yaw rate of the vehicle 20. The inclination sensor 32 detects the inclination of the vehicle 20. As will be described later in detail, the lock device 34 includes a plurality of lock units 34A (see FIG. 3A) for locking the drone 40 to the port 12. The actuator 36 performs acceleration, deceleration and steering of the vehicle 20.

The control device 200 is configured to include a central processing unit ((CPU): processor) 201, a read only memory (ROM) 202, a random access memory (RAM) 203, a storage 204, a communication IF (interface) 205, and an input-output IF 206. The CPU 201, the ROM 202, the RAM 203, the storage 204, the communication IF 205, and the input-output IF 206 are communicably connected with each other through a bus 208.

The CPU 201 is a central processing unit that executes various programs, and controls each unit. More specifically, the CPU 201 reads programs (including a takeoff program for vehicle side control at the time of takeoff of the drone 40) from the ROM 202 or the storage 204, executes the programs by using the RAM 203 as a work area, and performs control of each component members and various kinds of arithmetic processing.

The ROM 202 stores various programs and various data. As a work area, the RAM 203 temporarily stores programs or data. The storage 204 is constituted of a storage device, such as a hard disk drive (HDD) or a solid state drive (SSD), and stores various programs and various data. In the present embodiment, the ROM 202 or the storage 204 stores a takeoff program for vehicle side control for performing takeoff of the drone 40, or the like. The communication IF 205 is an interface for communicating with other devices, such as the flight controller 400 of the drone 40, and the server 14. For the communication, the communication IF 205 uses wireless communication standards, such as 4G, 5G, or Wi-Fi (registered trademark) standards, for example.

The input-output IF 206 is an interface for communicating with each device mounted in the vehicle 20. The control device 200 of the present embodiment is connected with the anemometer 22, the vehicle speed sensor 24, the GPS device 26, the car navigation device 28, the G sensor 30, the yaw rate sensor 31, the inclination sensor 32, the lock device 34, and the actuator 36 through the input-output IF 206. The anemometer 22, the vehicle speed sensor 24, the GPS device 26, the car navigation device 28, the G sensor 30, the yaw rate sensor 31, the inclination sensor 32, the lock device 34, and the actuator 36 may directly be connected to the bus 208.

FIG. 3A shows the schematic configuration view of the drone 40 disposed on the port 12 on the roof portion 20R of the vehicle 20. FIG. 3B shows the schematic configuration view of the drone 40 of FIG. 3A with an attitude changed to an inclined attitude.

As shown in FIG. 3A, the drone 40 includes a drone main body 42 equipped with a plurality of rotors 44. As the rotors 44, variable-pitch propellers are applicable. A total of four rotors 44 are provided as an example. When the drone main body 42 is viewed from an upper side, the four rotors 44 are disposed at equal intervals in a peripheral direction. The rotors 44 are driven by different motors 50, respectively. A plurality of skid units (leg units) 46 are provided so as to extend downward from the drone main body 42. A total of four skid units 46 are provided as an example. The skid units 46 are also provided at locations overlapped with the skid units 46 as shown in a viewing direction of FIG. 3A.

The skid units 46 have tip portions fixed to grounding members 48, respectively. The grounding members 48 are made of steel and constitute lock mechanisms 38 together with the lock units 34A. As the grounding members 48, steel formed into thin plates may be applied as an example. The grounding members 48 are locked and unlocked by different lock units 34A, respectively. The lock units 34A, which are provided in the port 12, are made of electromagnet. When prescribed magnetizing current is supplied to the lock units 34A, magnetic force is generated to attract and fix the grounding members 48. The control device 200 (see FIG. 2) controls magnetizing current supplied to the lock units 34A. Meanwhile, the drone 40 includes an inclination sensor 52 as the attitude detection unit that detects the attitude of the drone 40. The information on the attitude of the drone 40 detected by the inclination sensor 52 includes information indicating which side the body of the drone 40 inclines with respect to a horizontal attitude when the drone 40 has an inclined attitude, and an inclination angle of the body. In the inside of the drone main body 42, the flight controller 400 is provided.

Figure 4:
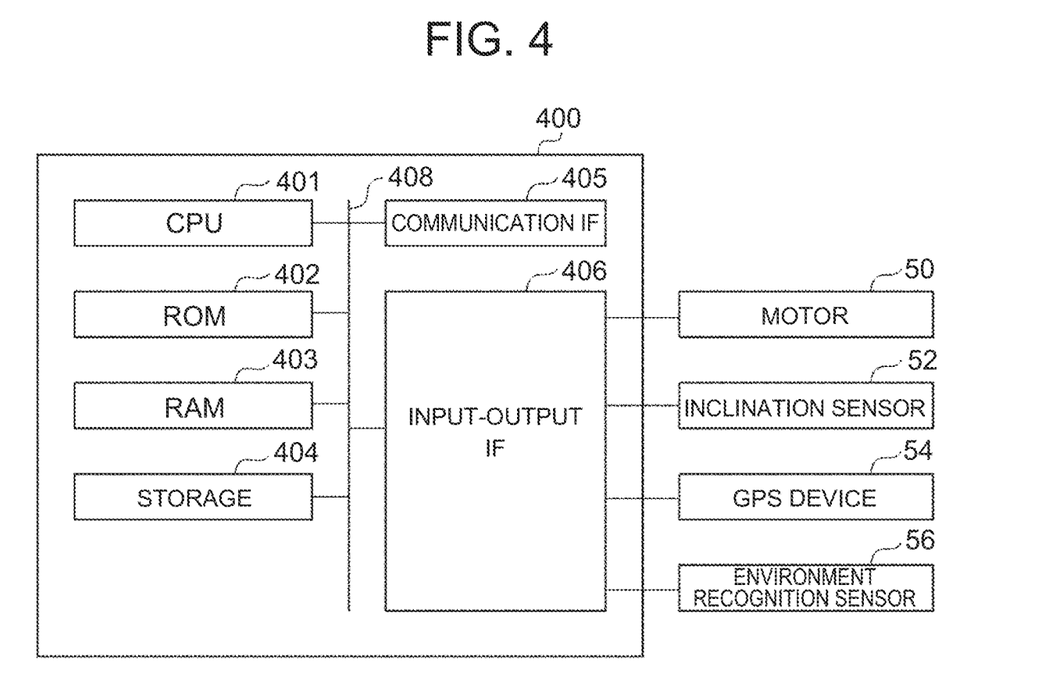
FIG. 4 is a block diagram showing an example of the hardware configuration of the devices mounted in the drone shown in FIG. 1.

In FIG. 4, an example of the hardware configuration of the devices mounted in the drone 40 is shown in the form of a block diagram. The drone 40 includes, in addition to the flight controller 400, the motors 50, and the inclination sensor 52 described above, a GPS device 54 that acquires the current position of the drone 40, and an environment recognition sensor 56 that recognizes the environment around the drone 40. Here, the environment recognition sensor 56 is configured to include an ultrasonic sensor, a gyro sensor, an atmospheric pressure sensor, or a compass.

The flight controller 400 is configured to include a CPU 401, a ROM 402, a RAM 403, a storage 404, a communication IF 405, and an input-output IF 406. The CPU 401, the ROM 402, the RAM 403, the storage 404, the communication IF 405, and the input-output IF 406 are communicably connected with each other through a bus 408.

The CPU 401 is a central processing unit that executes various programs, and controls each unit. More specifically, the CPU 401 reads programs (including a takeoff program for drone side control at the time of takeoff of the drone 40) from the ROM 402 or the storage 404, executes the programs by using the RAM 403 as a work area, and performs control of each component member and various kinds of arithmetic processing.

The ROM 402 stores various programs and various data. As a work area, the RAM 403 temporarily stores programs or data. The storage 404 is constituted of a storage device such as a HDD or an SSD, and stores various programs and various data. In the present embodiment, the ROM 402 or the storage 404 stores a takeoff program for drone side control for performing takeoff of the drone 40, or the like. The communication IF 405 is an interface for communicating with other devices, such as the control device 200 of the vehicle 20, and the server 14. For the communication, the communication IF 405 uses wireless communication standards, such as 4G, 5G, or Wi-Fi (registered trademark) standards, for example.

The input-output IF 406 is an interface for communicating with each device mounted in the drone 40. The flight controller 400 of the present embodiment is connected to the motors 50, the inclination sensor 52, the GPS device 54, and the environment recognition sensor 56 through the input-output IF 406. The motors 50, the inclination sensor 52, the GPS device 54, and the environment recognition sensor 56 may directly be connected to the bus 408.

Figure 5A:
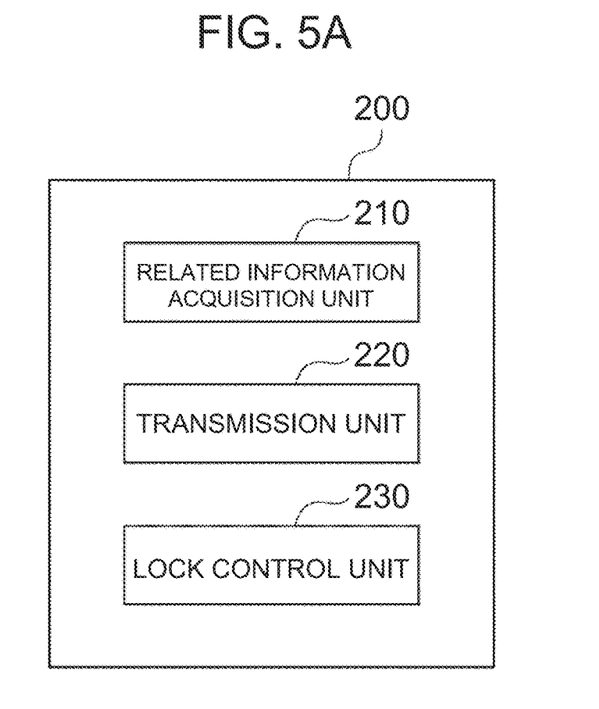
FIG. 5A is a block diagram showing an example of the functional configuration of a control device mounted in the vehicle of the first embodiment.

In FIG. 5A, an example of the functional configuration of the control device 200 mounted in the vehicle 20 is shown in the form of a block diagram. As shown in FIG. 5A, the control device 200 has a related information acquisition unit 210, a transmission unit 220, and a lock control unit 230. Each functional configuration is implemented when the CPU 201 reads and executes the takeoff program for vehicle side control that is stored in the ROM 202 or the storage 204.

Figure 5B:
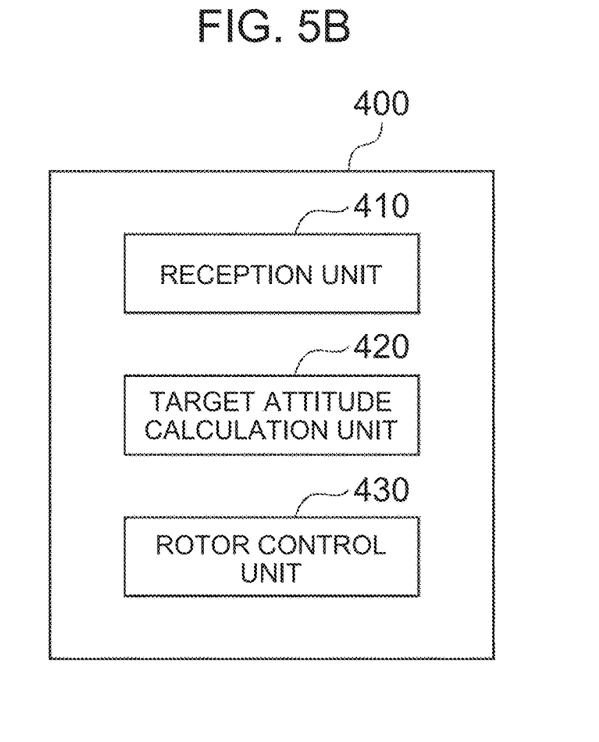
FIG. 5B is a block diagram showing an example of the functional configuration of a control device mounted in the drone of the first embodiment.

In FIG. 5B, an example of the functional configuration of the flight controller 400 mounted in the drone 40 is shown in the form of a block diagram. As shown in FIG. 5B, the flight controller 400 has a reception unit 410, a target attitude calculation unit 420, and a rotor control unit 430 as the functional configuration. Each functional configuration is implemented when the CPU 401 reads and executes the takeoff program for drone side control that is stored in the ROM 402 or the storage 404.

The related information acquisition unit 210 shown in FIG. 5A acquires information that is other than the information on the wind speed and the wind direction around the port 12 and that is related to factors that possibly influence the attitude of the drone 40 when the drone 40 is made to take a target attitude (target attitude calculated by the target attitude calculation unit 420 (see FIG. 5B)) on the port 12. In the following description, the information that the related information acquisition unit 210 acquires is properly shortened to "information related to attitude influence factors" for the sake of convenience. The related information acquisition unit 210 accesses the server 14 through the network N1 by using the communication IF 205 as an example, and communicates with the devices mounted in the vehicle 20 by using the input-output IF 206 to acquire the information related to the attitude influence factors.

The information related to attitude influence factors includes, for example, information on the current weather of air space above the port 12, and information on inclination of the port 12. A supplementary explanation is that when rain falls from the space above the port 12, the rain may influence the attitude of the drone 40. Another supplementary explanation is that when the port 12 horizontally inclines, the direction of the gravity acting on the up-down direction of the body (a central axis direction of the body) of the drone 40 changes, and therefore the inclination of the port 12 may influence the attitude of the drone 40.

The transmission unit 220 transmits the information acquired by the anemometer 22 and the information acquired by the related information acquisition unit 210 to the drone 40 without through the network N1. The reception unit 410 shown in FIG. 5B receives the information transmitted from the transmission unit 220 without through the network N1.

The target attitude calculation unit 420 calculates the target attitude (for example, the attitude as shown in FIG. 3B) of the drone 40 on the port 12 based on the acquisition result by the anemometer 22. The target attitude is an attitude set as a target. When the target attitude of the drone 40 on the port 12 needs to be set as an inclined attitude, the target attitude calculation unit 420 calculates which direction and at which degree to incline the body of the drone 40 on the port 12.

The target attitude of the drone 40 on the port 12 can be calculated as follows. For example, in a plane view as viewed from the upper side of the port 12, the target attitude calculation unit 420 calculates as the target attitude an attitude that enables the drone 40 to take off in a wind direction opposite to the wind direction acquired by the anemometer 22 and at a speed equivalent to the wind speed acquired by the anemometer 22. More specifically, in an example, the target attitude calculation unit 420 calculates as the target attitude an attitude that enables the drone 40, which has taken off from the port 12 on the traveling vehicle 20, to fly off, in accordance with the moving port 12, toward the upper side of the port 12 by the thrust obtained by the rotors 44.

The rotor control unit 430 shown in FIG. 5B can independently control each of the rotors 44. The rotor control unit 430 controls each of the rotors 44 so as to make the drone 40 on the port 12 take a target attitude calculated by the target attitude calculation unit 420. In the present embodiment, the rotors 44 are controlled by controlling the output of the motors 50 for the rotors 44. In the present embodiment, when controlling each of the rotors 44 so as to make the drone 40 on the port 12 to take the target attitude, the rotor control unit 430 adjusts the control on each of the rotors 44 in accordance with the information acquired by the related information acquisition unit 210 (i.e., information that is acquired by the related information acquisition unit 210, transmitted by the transmission unit 220, and received by the reception unit 410).

The lock control unit 230 shown in FIG. 5A can independently control locking and unlocking of each of the lock mechanisms 38. The lock control unit 230 causes some of the lock mechanisms 38 to lock while causing some of the remaining lock mechanisms to unlock so as to allow the drone 40 on the port 12 to take the target attitude calculated by the target attitude calculation unit 420, in accordance with the acquisition result by the anemometer 22. In the present embodiment, the lock control unit 230 also controls such that all the lock mechanisms 38 are put in an unlocked state, when the attitude of the drone 40 detected by the inclination sensor 52 coincides with the target attitude.

Next, effects of the flying object takeoff control system 10 will be described. The control processes executed in the flying object takeoff control system 10 are apportioned to the control device 200 mounted in the vehicle 20 and the flight controller 400 mounted in the drone 40. Therefore, description is hereinbelow given of the control processes apportioned to the control device 200 mounted in the vehicle 20 and the flight controller 400 mounted in the drone 40, respectively.

Figure 6:
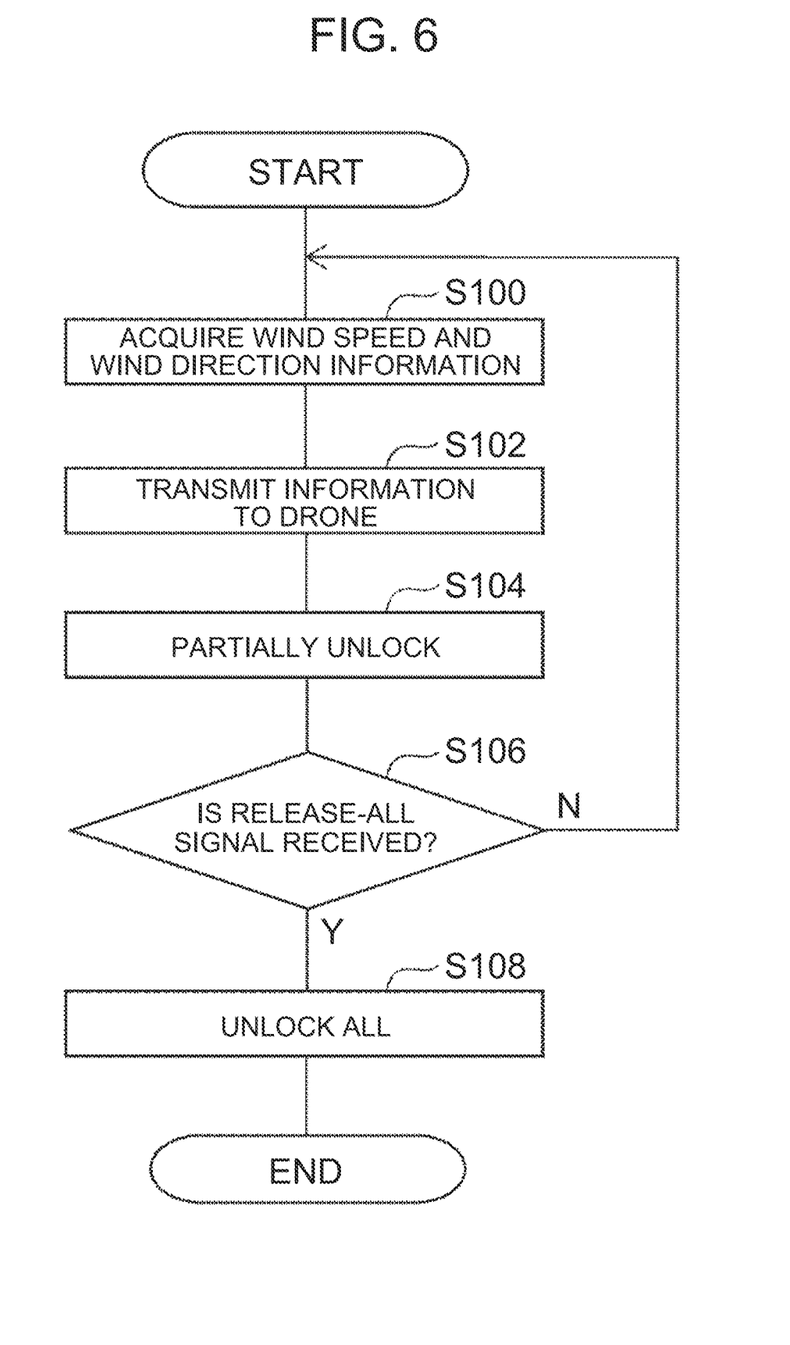
FIG. 6 is a flowchart showing an example of the flow of a control process performed by the control device mounted in the vehicle of the first embodiment.

FIG. 6 shows an example of the flow of the control process apportioned to the control device 200 mounted in the vehicle 20 as a flowchart. When the CPU 201 reads the takeoff program for vehicle side control from the ROM 202 or the storage 204, and expands and executes the program in the RAM 203, the control process by the control device 200 is performed. When an operator of the drone 40 performs a prescribed operation (an operation to press a takeoff switch for example), execution of the control process shown in FIG. 6 is started. At the time when the execution of the control process shown in FIG. 6 is started, the lock mechanisms 38 are all in a locked state, and the drone 40 is disposed in the state where all the skid units 46 are fixed onto the port 12.

First, the CPU 201 acquires a wind speed and a wind direction with the anemometer 22 (step S100). Next, the CPU 201 transmits the information acquired by the anemometer 22 to the drone 40 (step S102).

Next, the CPU 201 causes some of the lock mechanisms 38 to lock, while causing some of the remaining lock mechanisms 38 to unlock so as to make the drone 40 on the port 12 take a target attitude (target attitude calculated in later-described step S122 (see FIG. 7)) in accordance with the result of acquisition by the anemometer 22 (step S104). More specifically, the CPU 201 supplies magnetizing current to some of the lock units 34A, while restraining supply of the magnetizing current to some of the remaining lock units 34A. Therefore, the drone 40 can easily take an inclined attitude for takeoff on the port 12. During travel of the vehicle 20, the CPU 201 supplies magnetizing current to the lock units 34A arranged on the front side in a vehicle front-rear direction (one side in a broader sense) among the lock units 34A, while restraining supply of the magnetizing current to the lock units 34A arranged on the rear side in the vehicle front-rear direction (the other side in a broader sense) among the lock units 34A.

Next, the CPU 201 determines whether or not a release-all signal (signal transmitted in step S128 as will be described later (see FIG. 7)) is received from the drone 40 (step S106). When the CPU 201 determines that the release-all signal is not received from the drone 40 (step S106: N), the CPU 201 repeats the process from step S100. Meanwhile, when the CPU 201 determines that the release-all signal is received from the drone 40 (step S106: Y), the CPU 201 shifts to the process of step S108.

In step S108, the CPU 201 controls the lock device 34 such that all the lock mechanisms 38 are in an unlock condition (i.e., such that magnetizing current is not supplied to any of the lock units 34A). The CPU 201 then ends the control process shown in FIG. 6 (in other words, ends the takeoff program for vehicle side control).

Figure 7:
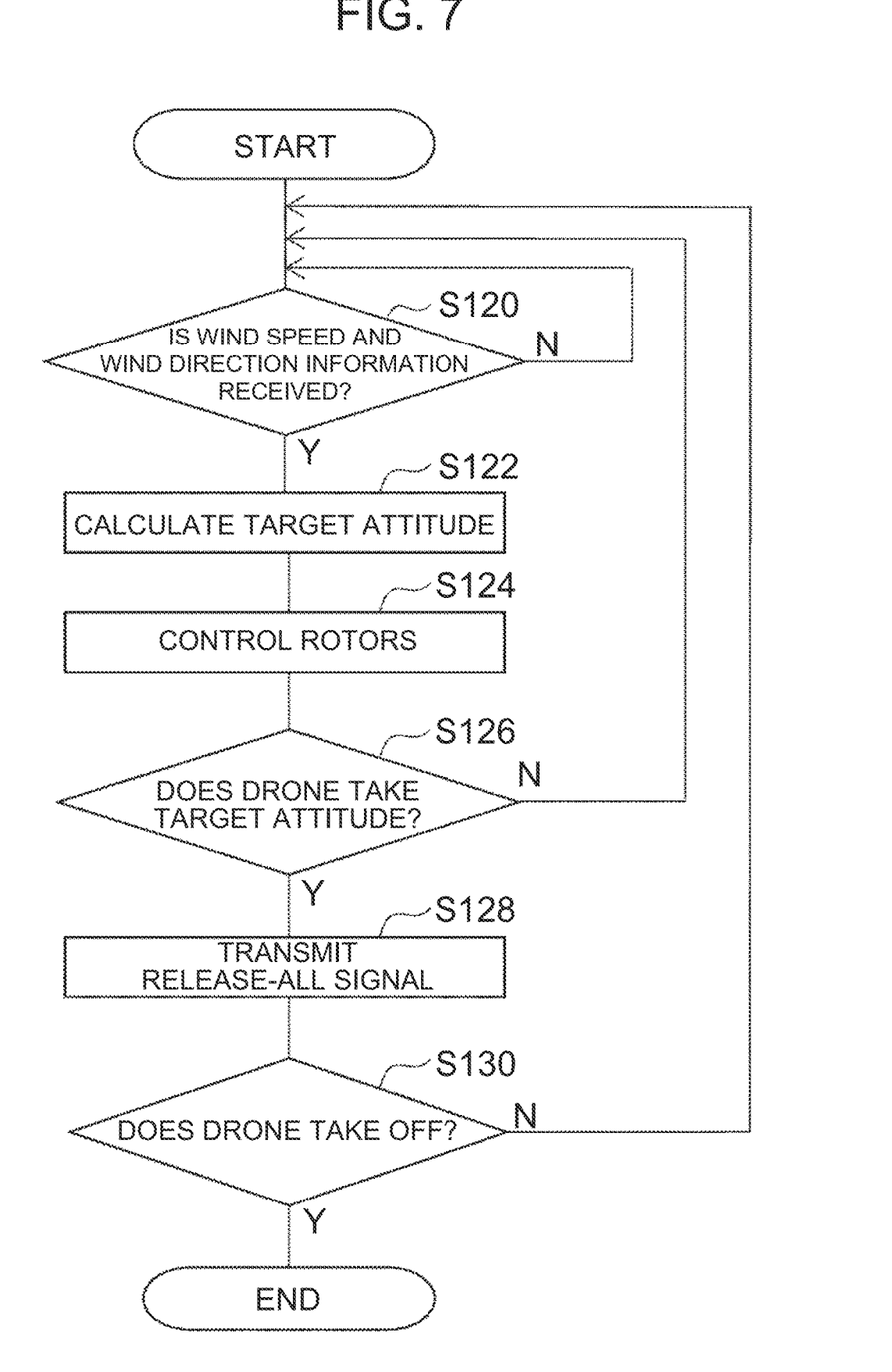
FIG. 7 is a flowchart showing an example of the flow of a control process performed by the control device mounted in the drone of the first embodiment.

FIG. 7 shows an example of the flow of the control process apportioned to the flight controller 400 mounted in the drone 40 as a flowchart. When the CPU 401 reads the takeoff program for drone side control from the ROM 402 or the storage 404, and expands and executes the program in the RAM 403, the control process by the flight controller 400 is performed. When an operator of the drone 40 performs a prescribed operation for takeoff (an operation to press a takeoff switch for example), execution of the control process shown in FIG. 7 is started. At the time when execution of the control process shown in FIG. 7 is started, the drone 40 is disposed in the state where all the skid units 46 are fixed onto the port 12.

First, the CPU 401 determines whether or not the information on the wind speed and wind direction acquired by the anemometer 22 is received (step S120). When the CPU 401 determines that the information on the wind speed and wind direction is not received (step S120: N), the CPU 401 repeats the process of step S120. Meanwhile, when the CPU 401 determines that the information on the wind speed and wind direction is received (step S120: Y), the CPU 401 shifts to the process of step S122.

In step S122, the CPU 401 calculates a target attitude of the drone 40 on the port 12 based on the result of acquisition by the anemometer 22. In the present embodiment, the target attitude of the drone 40 is the same as the attitude of the drone 40 when, for example, the drone 40 is ready to take off in the direction immediately above the port 12 that is moving with the vehicle 20 traveling.

Next, the CPU 401 controls each of the rotors 44 so as to make the drone 40 on the port 12 take the target attitude (calculated in step S122) (step S124). Execution of such control makes it possible to achieve smooth takeoff of the drone 40 including the rotors 44 without providing an angle changing function in the port 12. While, for example, the vehicle 20 is traveling, the CPU 401 controls each of the rotors 44 in consideration of running wind.

In step S124, the CPU 401 adjusts control on each of the rotors 44 in accordance with the information related to attitude influence factors (information acquired by the related information acquisition unit 210). Thus, it is possible to make the drone 40 on the port 12 easily take the target attitude, and allows smoother takeoff of the drone 40.

Next, the CPU 401 determines whether or not the attitude of the drone 40 detected by the inclination sensor 52 coincides with the target attitude (step S126). When the CPU 401 determines that the attitude of the drone 40 detected by the inclination sensor 52 does not coincide with the target attitude (step S126: N), the CPU 401 repeats the process from step S120. Meanwhile, when the CPU 401 determines that the attitude of the drone 40 detected by the inclination sensor 52 coincides with the target attitude (step S126: Y), the CPU 401 shifts to the process of step S128 to transmit a release-all signal which is a command signal for unlocking all the lock mechanisms 38 to the vehicle 20.

Next, the CPU 401 determines whether or not the drone 40 takes off from the port 12 (step S130). When the CPU 401 determines that the drone 40 does not take off from the port 12 (step S130: N), the CPU 401 repeats the process from step S120. Meanwhile, when the CPU 401 determines that the drone 40 takes off from the port 12 (step S130: Y), the CPU 401 ends the control process shown in FIG. 7 (in other words, ends the takeoff program for drone side control).

As described in the foregoing, the flying object takeoff control system 10 of the present embodiment enables the drone 40 including the rotors 44 to smoothly take off under the situation where wind is blowing, without providing an angle changing function to the port 12.

In the present embodiment, since the angle changing function is not provided in the port 12, the cost of manufacturing the port 12 can be reduced as compared with the configuration where the angle changing function is provided in the port, and the port 12 can easily be provided in the vehicle 20.

In the present embodiment, since the drone 40 takes off after confirming that the drone 40 has a target attitude using the information from the inclination sensor 52 included in the drone 40, smoother takeoff of the drone 40 can be achieved.

In the present embodiment, since the anemometer 22 is provided in the port 12 instead of in the drone 40, the weight of the drone 40 can be reduced accordingly.

Second Embodiment

Next, a second embodiment will be described with reference to FIGS. 8A to 10, in addition to FIGS. 1 to 4. A flying object takeoff control system of the present embodiment is similar to the flying object takeoff control system 10 of the first embodiment except for the point described below. The component members similar to those in the first embodiment are denoted by the same reference signs to omit description. Since the hardware configuration of the flying object takeoff control system of the present embodiment is similar to the hardware configuration of the flying object takeoff control system 10 of the first embodiment, FIGS. 1 to 4 are used to omit illustration and detailed description.

In the present embodiment, the ROM 202 or the storage 204 of the control device 200 shown in the FIG. 2, which is mounted in the vehicle 20 (see FIG. 1), stores a takeoff program for vehicle side control similar to the takeoff program for vehicle side control described in the first embodiment, an automatic takeoff program for vehicle side control that is different from the takeoff program for vehicle side control described in the first embodiment, and the like.

In the present embodiment, the ROM 402 or the storage 404 of the flight controller 400 shown in the FIG. 4, which is mounted in the drone 40 (see FIG. 1), stores a takeoff program for drone side control similar to the takeoff program for drone side control described in the first embodiment, an automatic takeoff program for drone side control that is different from the takeoff program for drone side control described in the first embodiment, and the like.

Figure 8A:
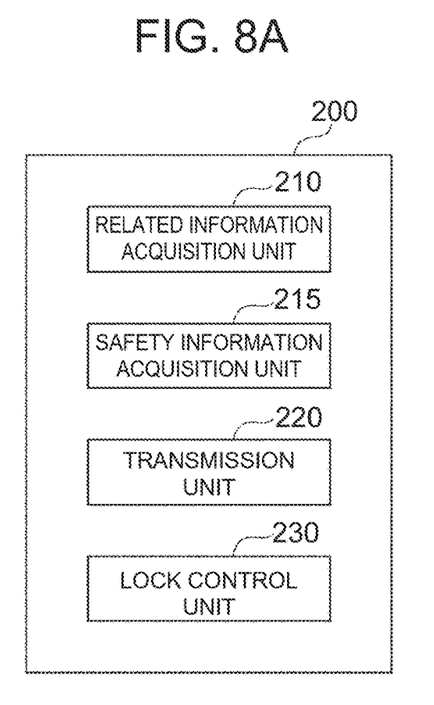
FIG. 8A is a block diagram showing an example of the functional configuration of a control device mounted in the vehicle of a second embodiment.

In FIG. 8A, an example of the functional configuration of the control device 200 of the present embodiment that is mounted in the vehicle 20 is shown in the form of a block diagram. As shown in FIG. 8A, the control device 200 includes the related information acquisition unit 210, a safety information acquisition unit 215, the transmission unit 220, and the lock control unit 230. Each functional configuration is implemented when the CPU 201 reads and executes the automatic takeoff program for vehicle side control that is stored in the ROM 202 or the storage 204.

The safety information acquisition unit 215 accesses the server 14 through the network N1 by using the communication IF 205, and communicates with each device mounted in the vehicle 20 by using the input-output IF 206 to acquire information related to safety of takeoff of the drone 40. The transmission unit 220 transmits the information acquired by the anemometer 22, the information acquired by the related information acquisition unit 210, and the information acquired by the safety information acquisition unit 215 to the drone 40 without through the network N1.

The information related to the safety of takeoff of the drone 40 includes, for example, information on drone no-fly zones, such as areas around airports, information on weather reports for each area at each time slot, information on the current position of the vehicle 20, destination information input into the car navigation device 28, and information related to the vehicle speed of the vehicle 20.

Figure 8B:
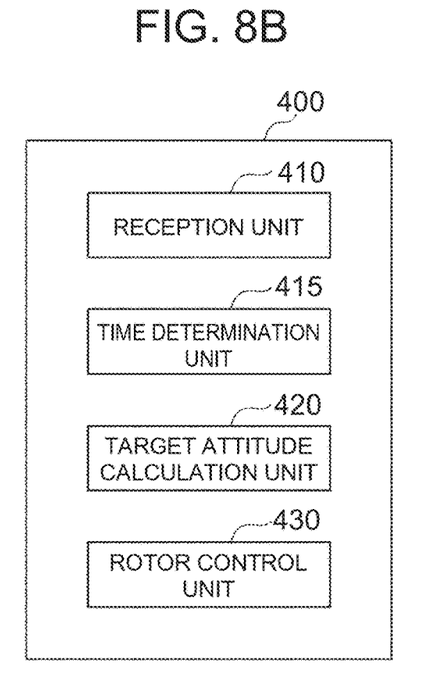
FIG. 8B is a block diagram showing an example of the functional configuration of a control device mounted in the drone of the second embodiment.

In FIG. 8B, an example of the functional configuration of the flight controller 400 of the present embodiment that is mounted in the drone 40 is shown in the form of a block diagram. As shown in FIG. 8B, the flight controller 400 includes the reception unit 410, a time determination unit 415, the target attitude calculation unit 420, and the rotor control unit 430 as the functional configuration. Each functional configuration is implemented when the CPU 401 reads and executes the automatic takeoff program for drone side control that is stored in the ROM 402 or the storage 404.

The time determination unit 415 determines takeoff time of the drone 40 based on the information acquired by the safety information acquisition unit 215 (information that is acquired by the safety information acquisition unit 215, transmitted by the transmission unit 220, and received by the reception unit 410 in the present embodiment).

The takeoff time of the drone 40 is determined as follows as an example. For example, the time determination unit 415 first predicts a future position of the vehicle 20 at each time based on the information on the current position of the vehicle 20, the destination information input into the car navigation device 28, the information related to the vehicle speed of the vehicle 20, or the like. Next, the time determination unit 415 determines as takeoff time of the drone 40 the time when the vehicle 20 is predicted to be out of the drone no-fly zone and not under bad weather, based on the predicted future position of the vehicle 20 at each time, the information on the drone no-fly zone, and the information on weather reports for each area and at each time slot.

The rotor control unit 430 controls each of the rotors 44 so as to make the drone 40 take the target attitude at the takeoff time determined by the time determination unit 415. At the time, the rotor control unit 430 adjusts the control on each of the rotors 44 in accordance with the information acquired by the related information acquisition unit 210 (i.e., information that is acquired by the related information acquisition unit 210, transmitted by the transmission unit 220, and received by the reception unit 410).

Next, effects of the flying object takeoff control system of the present embodiment will be described. The control processes executed in the flying object takeoff control system of the present embodiment are apportioned to the control device 200 mounted in the vehicle 20 and the flight controller 400 mounted in the drone 40. Therefore, description is hereinbelow given of the control processes apportioned to the control device 200 mounted in the vehicle 20 and the flight controller 400 mounted in the drone 40, respectively.

Figure 9:
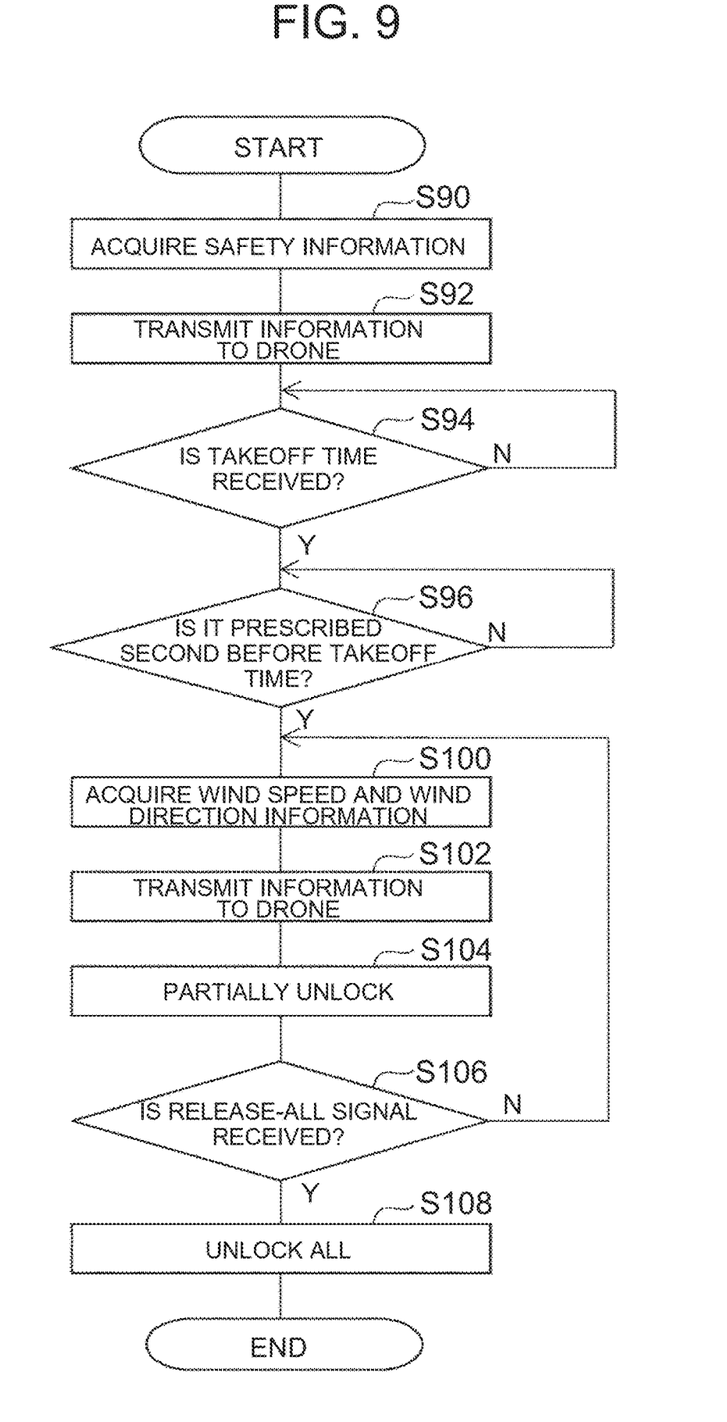
FIG. 9 is a flowchart showing an example of the flow of a control process performed by the control device mounted in the vehicle of the second embodiment.

FIG. 9 shows an example of the flow of the control process apportioned to the control device 200 mounted in the vehicle 20 of the present embodiment as a flowchart. When the CPU 201 reads the automatic takeoff program for vehicle side control from the ROM 202 or the storage 204, and expands and executes the program in the RAM 203, the control process by the control device 200 is performed. When an operator of the drone 40 performs a prescribed operation for automatic takeoff (an operation to press an automatic takeoff switch as an example), execution of the control process shown in FIG. 9 is started. At the time when the execution of the control process shown in FIG. 9 is started, the lock mechanisms 38 are all in a locked state, and the drone 40 is disposed in the state where all the skid units 46 are fixed onto the port 12.

First, the CPU 201 acquires information related to safety of takeoff of the drone 40 (which is hereinafter suitably shortened to "safety information") (step S90). Next, the CPU 201 transmits the safety information to the drone 40 (step S92).

Next, the CPU 201 determines whether or not information on takeoff time (takeoff time determined in step S112 as will be described later (see FIG. 10)) is received (step S94). When the CPU 201 determines that the information on takeoff time is not received (step S94: N), the CPU 201 repeats the process of step S94. Meanwhile, when the CPU 201 determines that the information on the takeoff time is received (step S94: Y), the CPU 201 shifts to the process of step S96.

In step S96, the CPU 201 determines whether it is a prescribed second before the takeoff time. When the CPU 201 determines that it is not a prescribed second before the takeoff time (step S96: N), the CPU 201 repeats the process of step S96. Meanwhile, when the CPU 201 determines that it is a prescribed second before the takeoff time (step S96: Y), the CPU 201 shifts to the process of step S100. Since the processes of step S100 to step S108 are the same as the processes of step S100 to step S108 shown in FIG. 6, detailed explanation thereof is omitted.

Figure 10:
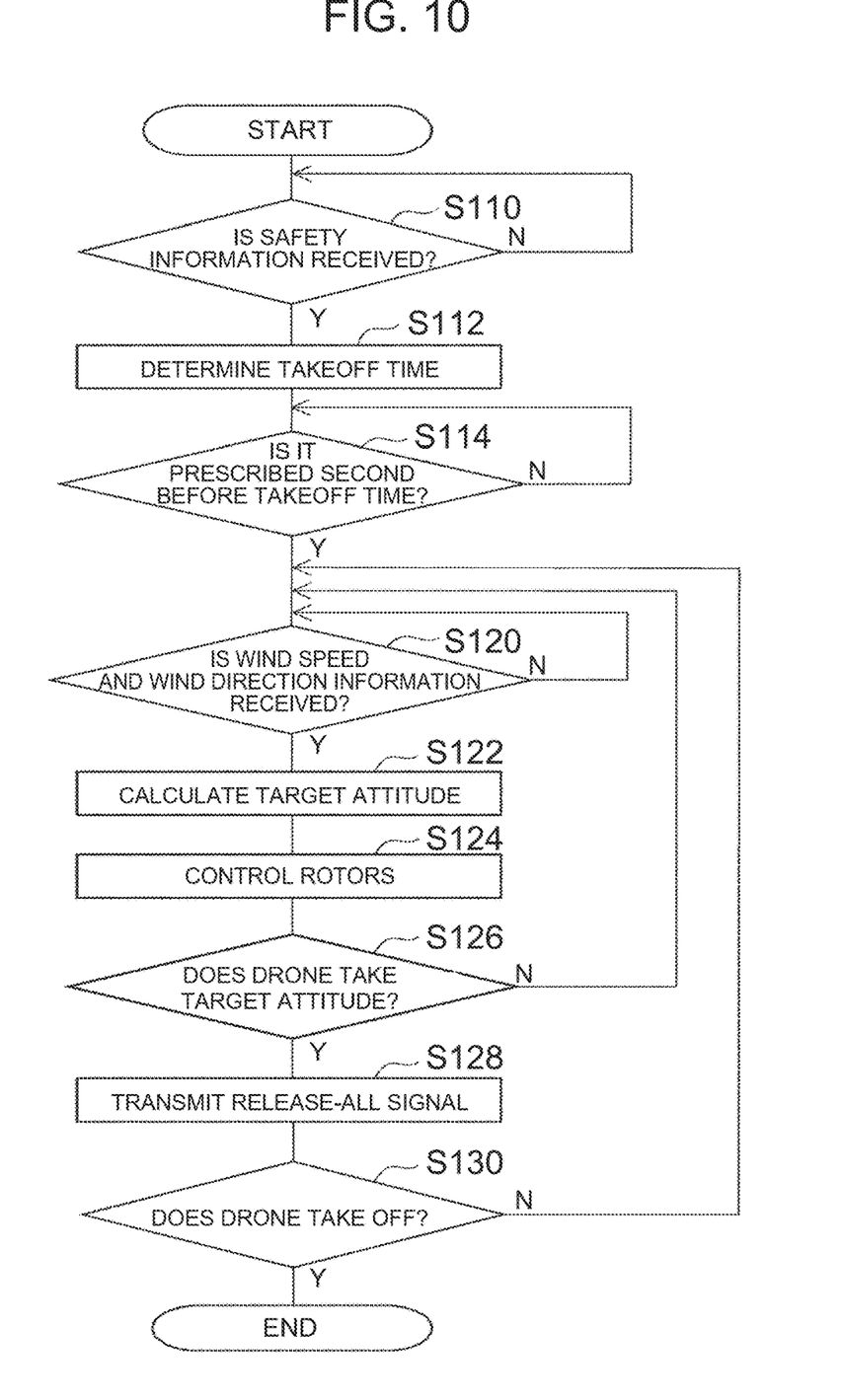
FIG. 10 is a flowchart showing an example of the flow of a control process performed by the control device mounted in the drone of the second embodiment.

FIG. 10 shows an example of the flow of the control process apportioned to the flight controller 400 that is mounted in the drone 40 of the present embodiment as a flowchart. When the CPU 401 reads the automatic takeoff program for drone side control from the ROM 402 or the storage 404, and expands and executes the program in the RAM 403, the control process by the flight controller 400 is performed. When an operator of the drone 40 performs a prescribed operation for automatic takeoff (an operation to press an automatic takeoff switch for example), execution of the control process shown in FIG. 10 is started. At the time when execution of the control process shown in FIG. 10 is started, the drone 40 is disposed in the state where all the skid units 46 are fixed onto the port 12.

First, the CPU 401 determines whether or not safety information is received from the side of the vehicle 20 (step S110). When the CPU 401 determines that the safety information is not received (step S110: N), the CPU 401 repeats the process of step S110. Meanwhile, when the CPU 401 determines that the safety information is received (step S110: Y), the CPU 401 shifts to the process of step S112.

In step S112, the CPU 401 determines the takeoff time of the drone 40 based on the received safety information.

Next, the CPU 401 determines whether or not it is a prescribed second before the takeoff time that is determined in step S112 (step S114). When the CPU 401 determines that it is not a prescribed second before the takeoff time (step S114: N), the CPU 401 repeats the process of step S114. Meanwhile, when the CPU 401 determines that it is a prescribed second before the takeoff time (step S114: Y), the CPU 401 shifts to the process of step S120. Since the processes of step S120 to step S130 are the same as the processes of step S120 to step S130 shown in FIG. 7, detailed explanation thereof is omitted.

In the second embodiment, it is possible to easily make the drone 40 on the port 12 take a target attitude at takeoff time, and to achieve smooth takeoff of the drone 40 at the takeoff time.

Supplementary Description of Embodiments

In the first and second embodiments, the lock mechanisms 38 use electromagnetic force. However, the lock mechanisms may be mechanical lock mechanisms that are locked when lock mechanism components are engaged with each other. For example, the lock mechanisms may each be configured to include an engaged portion provided on a lower end of the skid (46) of the drone (40), a hook provided in the port (12) and engageable with the engaged portion, and an actuator (illustration omitted) for moving the hook between a position in engagement with the engaged portion and a position not in engagement with the engaged portion.

In the first and second embodiments, the lock mechanisms 38 are provided to lock the drone 40 to the port 12. Although such configuration is preferable, the configuration without the lock mechanisms 38 can also be adopted.

In the first and second embodiments, the lock control unit 230 controls such that all the lock mechanisms 38 are put in an unlocked state, when the attitude of the drone 40 detected by the inclination sensor 52 coincides with the target attitude. Although such configuration is preferable, the lock control unit may control each of the rotors (44) to make the drone (40) on the port (12) to take a target attitude without using the detection result of the attitude detection unit (the inclination sensor 52 in the embodiments), and then the lock control unit may control such that all the lock mechanisms (38) are in an unlock state.

As a modification of the first and second embodiments, it is also possible to adopt the configuration where the rotor control unit (430) does not use the information acquired by the related information acquisition unit (210), when controlling each of the rotors 44 so as to make the drone 40 on the port 12 take the target attitude.

As a modification of the first and second embodiments, it is also possible to adopt the configuration where the wind speed and wind direction acquisition unit (the anemometer 22 in the embodiments) is provided in the drone (40). As a modification of the first and second embodiments, it is also possible to adopt the configuration where the tip portions of the skid units (46) are each fixed to electromagnet in place of the steel grounding member (48), the lock units (34A) on the port (12) are replaced with steel members, and the lock control unit (230) is provided in the drone (40). As a modification of the second embodiment, it is also possible to adopt the configuration where the time determination unit (415) is provided in the vehicle (20).

As a modification of the second embodiment, it is also possible to adopt the configuration where a time slot determination unit is provided to determine the time slot when the drone (40) is to take off based on the information acquired by the safety information acquisition unit (215), and the rotor control unit (430) controls each of the rotors (44) to make the drone (40) take a target attitude at a stage when a prescribed condition (for example, the wind speed around the port is equal to or less than a specified value) is satisfied in the time slot when the drone (40) is to take off.

In the first and second embodiments, the port 12 is provided in the vehicle 20. However, the port may be provided in a ship or the like, other than the vehicle.

In the first and second embodiments, the flying object is the drone 40. However, the flying object may be a manned flying object.

In the first and second embodiments, the processes are executed when the CPU 201 shown in FIG. 2 and the CPU 401 shown in FIG. 4 read and execute software (programs), respectively. However, the processes may be executed by various kinds of processors other than CPUs. Examples of the processors in this case may include programmable logic devices (PLDs) capable of changing circuit configuration after manufacturing, such as field-programmable gate arrays (FPGAs), and exclusive electrical circuits that are processors having circuit configuration exclusively designed for execution of specific processes, such as application specific integrated circuits (ASICs). Each of the processes may be executed by one of these various kinds of processors, or may be executed by a combination of two or more processors of the same kind or different kinds (for example, a plurality of FPGAs, a combination of a CPU and an FPGA, or the like). More specifically, the hardware structure of these various kinds of processors is an electrical circuit formed by combining circuit elements, such as semiconductor elements.

Each of the programs described in the embodiments may be provided in the form of being recorded in storage media, such as compact disk read only memories (CD-ROMs), digital versatile disc read only memories (DVD-ROMs), and universal serial bus (USB) memories. The programs may also be downloaded from external apparatuses through a network.

The embodiments and the modifications may be executed in appropriate combinations.

Although examples of the present disclosure have been described in the foregoing, the present disclosure is not limited to the examples. It is naturally understood that various modifications are possible without departing from the scope of the disclosure.

What is claimed is:

1. A flying object takeoff control system, comprising:
a flying object including a plurality of rotors;
a port used for the flying object to take off;
a wind speed and wind direction acquisition unit configured to acquire wind speed and wind direction around the port;
a target attitude calculation unit configured to calculate a target attitude of the flying object on the port, based on a result of acquisition by the wind speed and wind direction acquisition unit;
a rotor control unit configured to
control each of the rotors independently, and
control each of the rotors so as to make the flying object on the port take the target attitude;
a plurality of lock mechanisms configured to lock the flying object to the port; and
a lock control unit configured to control locking and unlocking of each of the lock mechanisms independently, and configured to cause some of the lock mechanisms to lock while causing some of the remaining lock mechanisms to unlock so as to allow the flying object on the port to take the target attitude, in accordance with the result of acquisition by the wind speed and wind direction acquisition unit, wherein
while said some of the plurality of lock mechanisms are locked and said some of the remaining lock mechanisms are unlocked to allow the flying object on the port to take the target attitude, the lock control unit unlocks all of the plurality of lock mechanisms in response to detecting the attitude of the flying object coinciding with the target attitude.

2. The flying object takeoff control system according to claim 1, wherein:
the flying object includes an attitude detection unit configured to detect an attitude of the flying object; and
the lock control unit controls so as to unlock all the lock mechanisms, when the attitude of the flying object detected by the attitude detection unit coincides with the target attitude.

3. The flying object takeoff control system according to claim 1, further comprising a related information acquisition unit configured to acquire information that is other than the information on the wind speed and the wind direction around the port and that is related to an attitude of the flying object when the flying object is made to take the target attitude on the port, wherein
the rotor control unit adjusts control on each of the rotors in accordance with the information acquired by the related information acquisition unit, when each of the rotors is controlled so as to make the flying object on the port take the target attitude.

4. The flying object takeoff control system according to claim 3, further comprising:
a safety information acquisition unit configured to acquire information related to safety of takeoff of the flying object; and
a time determination unit configured to determine takeoff time of the flying object based on the information acquired by the safety information acquisition unit, wherein
the rotor control unit controls each of the rotors so as to make the flying object take the target attitude at the takeoff time, and when performing the control, the rotor control unit adjusts the control on each of the rotors in accordance with the information acquired by the related information acquisition unit.

5. The flying object takeoff control system according to claim 1, wherein:
the wind speed and wind direction acquisition unit is provided in the port; and
the target attitude calculation unit and the rotor control unit are provided in the flying object,
the flying object takeoff control system further comprising:
a transmission unit configured to transmit information acquired by the wind speed and wind direction acquisition unit to the flying object; and
a reception unit provided in the flying object and configured to receive the information transmitted from the transmission unit.

6. The flying object takeoff control system according to claim 1, wherein the port is provided in a vehicle.

* * * * *